United States Patent
Young et al.

(10) Patent No.: US 8,126,324 B2
(45) Date of Patent: Feb. 28, 2012

(54) CAMERA WITH SATELLITE POSITIONING SYSTEM

(75) Inventors: Bryan Young, Haywards Heath (GB); Johan Peeters, Bierbeek (BE)

(73) Assignee: U-Blox A.G., Thalwil (CH)

( * ) Notice: Subject to any disclaimer, the term of this patent is extended or adjusted under 35 U.S.C. 154(b) by 9 days.

(21) Appl. No.: 12/812,943

(22) PCT Filed: Jan. 16, 2009

(86) PCT No.: PCT/EP2009/050490
§ 371 (c)(1),
(2), (4) Date: Jul. 14, 2010

(87) PCT Pub. No.: WO2009/090241
PCT Pub. Date: Jul. 23, 2009

(65) Prior Publication Data
US 2010/0316368 A1   Dec. 16, 2010

(30) Foreign Application Priority Data

Jan. 18, 2008 (EP) .......................... 08100663
Nov. 11, 2008 (GB) .......................... 0820612.0

(51) Int. Cl.
*G03B 15/00* (2006.01)
(52) U.S. Cl. ......................................... 396/310
(58) Field of Classification Search .................... 396/310
See application file for complete search history.

(56) References Cited

U.S. PATENT DOCUMENTS

| 5,726,660 A | * | 3/1998 | Purdy et al. ............. 342/357.75 |
| 5,913,078 A | * | 6/1999 | Kimura et al. .................. 396/50 |
| 6,201,501 B1 | | 3/2001 | Arkko et al. |
| 7,382,405 B2 | * | 6/2008 | Kusaka et al. ............. 348/231.6 |
| 2006/0208943 A1 | | 9/2006 | Gronemeyer |
| 2007/0254640 A1 | | 11/2007 | Bliss |
| 2008/0055164 A1 | | 3/2008 | Zhang et al. |

FOREIGN PATENT DOCUMENTS

| EP | 1 377 038 A2 | | 1/2004 |
| EP | 1 406 344 A1 | | 4/2004 |
| EP | 1 710 600 A1 | | 10/2006 |
| JP | 2000-349527 | | 12/2000 |
| JP | 2004053384 A | * | 2/2004 |

* cited by examiner

*Primary Examiner* — Clayton E LaBalle
*Assistant Examiner* — Leon W. Rhodes, Jr.
(74) *Attorney, Agent, or Firm* — Blakely, Sokoloff, Taylor & Zafman

(57) ABSTRACT

A camera includes a satellite positioning system. The camera comprises a camera lens (32) having a focal axis (36), a satellite receiver for receiving data samples of satellite broadcast and a satellite system antenna (38). The satellite system antenna (38) has a gain in the direction of the lens axis which is greater than the gain in all directions perpendicular to the lens axis.

12 Claims, 3 Drawing Sheets

CAMERA WITH SATELLITE POSITIONING SYSTEM

This is a non-provisional application claiming the benefit of International application number PCT/EP2009/050490 filed Jan. 16, 2009.

This invention relates to satellite positioning systems, such as GPS, and in particular relates to the integration of such systems into a camera.

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

Nearly all current GPS receivers work by processing signals from the satellites in "real time", as they come in, reporting the position of the device at the current time. Such "conventional" GPS receivers invariably comprise:

- an antenna suitable for receiving the GPS signals,
- analogue RF circuitry (often called a GPS front end) designed to amplify, filter, and mix down to an intermediate frequency (IF) the desired signals so they can be passed through an appropriate analogue-to-digital (A/D) convertor at a sample rate normally of the order of a few MHz,
- digital signal processing hardware that carries out the correlation process on the IF data samples generated by the A/D converter, normally combined with some form of micro controller that carries out the "higher level" processing necessary to control the signal processing hardware and calculate the desired position fixes.

The less well known concept of "Store and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the grabs can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

This invention relates specifically to the integration of a satellite positioning system into a camera. The ability to record a location at which a photograph was taken has been recognised as a valuable feature. A camera may perform GPS processing so that position information is available straight away, or the store and process system described above can be used.

The GPS antenna for such a system is typically placed at the top of the camera, with the greatest sensitivity/gain of the radiation pattern aligned with an upward direction. This is of course desirable so that the antenna has a good view of the sky.

The invention is based on the recognition that this antenna orientation is in some applications not the optimum arrangement.

According to the invention, there is provided a camera including a system for collecting data from a satellite positioning system, the camera comprising:

- a camera lens having a lens axis;
- a satellite receiver for receiving satellite broadcast data; and
- a satellite system antenna, wherein the satellite system antenna has a gain value in the direction of the lens axis which is greater than the gain in all directions perpendicular to the lens axis.

This arrangement essentially uses a forward pointing antenna (or an antenna having a component of its gain response pointing forwards which is greater than a component of its gain response pointing in a vertical plane). Although this is not intuitively the direction to obtain the strongest GPS signal, there are additional factors which have been identified which mean that the overall performance is improved by this arrangement.

The forward direction means that the antenna can be mounted parallel to the front surface plane of the camera rather than at the top. This allows an improved form factor for an effective patch antenna implementation, as the front area is greater than the top area of a typical camera.

The front area of the camera is also less prone to obstruction. As the forward direction is the direction from the lens to the subject of the photograph, the user of the camera will keep his hands, as well as the camera strap/case and other objects, free from this area of the camera. This antenna positioning is thus less likely to be subject to interference from objects in the signal path.

A patch antenna implementation can also use the large ground plane formed by the form factor of the back of the camera, rather than the small cross section looking downwards at the camera base.

A further advantage is that the camera itself screens the antenna from the human body.

In a patch antenna implementation, the patch may comprise an opening through which the lens axis passes.

This arrangement, in which the camera lens looks through a hole or other opening in the antenna, may be particularly advantageous. The lens of the camera is the part of the camera least likely to be covered when taking a photograph. Therefore, by locating the antenna around the lens axis in this way, the chances of receiving strong satellite signals, without occlusion, at the antenna may be maximised. This arrangement can also make better use of the available area on the face of the camera body, compared to locating the patch away from the lens axis. This can allow the size of the patch antenna to be increased, or allow a patch of the same size to be incorporated in a smaller camera.

The camera lens may be arranged in the opening.

Positioning the camera optical elements within the opening itself can allow the form factor of the camera in the direction of the optical axis to be reduced. That is, the thickness of the overall camera unit can be minimised.

The antenna may be electrically connected to the satellite receiver through the opening.

Arranging the antenna RF feed in the opening may give improved antenna characteristics.

The camera may comprise a memory which is adapted to store data samples, and the camera does not have the capability to process the samples to derive position information. In this way, a store and process later system is implemented. A store and process system does not provide any real time position information, and this means the usage of the GPS system is very different to the more conventional applications, such as navigation. In a navigation system, the screen is held substantially flat horizontal during use. This would rule out the possibility of a forward-pointing GPS antenna, as it would then be pointing substantially downwards during use of the application.

In the store and process later application, the GPS system is only used when taking a photograph. This is known as "Geotagging" photos. The interpretation and use of the position fix occurs after the capture of the GPS signal. The invention is thus of particular interest for this type of application.

However, the camera may instead have real time GPS capability, and comprise processing means for deriving position information from the data samples.

An example of the invention will now be described in detail with reference to the accompanying drawings, in which.

Figure 1:
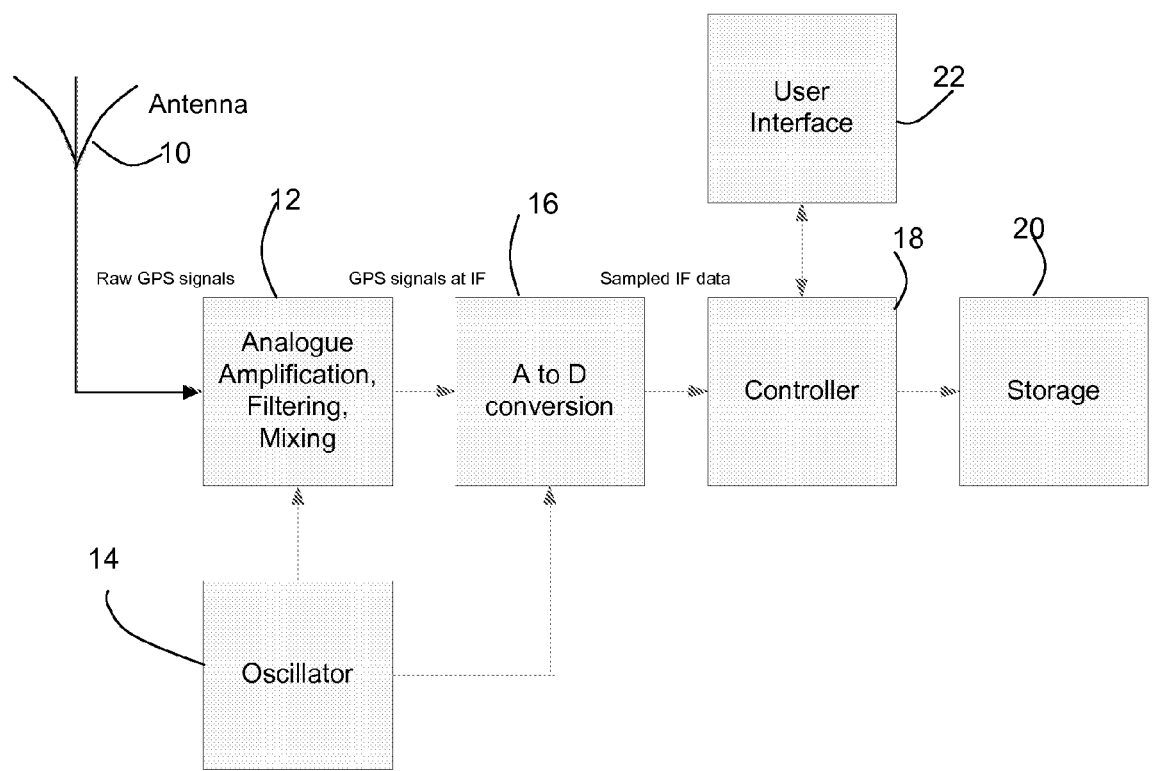
FIG. 1 shows the components required to implement a store and process GPS system in a camera.

It should be noted that these figures are diagrammatic and not drawn to scale. Relative dimensions and proportions of parts of these figures have been shown exaggerated or reduced in size, for the sake of clarity and convenience in the drawings.

The invention provides a GPS-enabled camera in which the GPS system antenna points in a direction at least partially aligned with the camera lens axis.

To illustrate the invention, an example will be given of the main components of a store and process later system, which can be used in a camera of the invention so that position and time information can be linked to images stored. The key components of the system are illustrated in FIG. 1.

The signals from the GPS satellites are received by an antenna 10 and then put through conventional analogue processing, typically comprising a combination of amplification, filtering and down mixing in unit 12 driven by a reference oscillator 14 (normally a temperature compensated crystal), followed by A/D conversion in unit 16. This is the conventional radio receiver electronics forming the RF front end.

A controller 18, implemented as discrete logic or a micro processor with associated firmware, selects portions of the sampled IF data generated by the RF front end to be stored in the storage device 20, for example a flash RAM, hard disc etc.

The device records short blocks of IF data from the RF front end (these short blocks are termed "grabs" in the following description).

The grabs may be for example 100 ms long and they could be recorded once every 10 s. The exact values used could be varied explicitly or implicitly by the user via the GUI 22. If position information is desired for a specific point in time (for example when a photograph is taken), data can be stored to identify the desired point in time. Alternatively, a grab may be taken only at the time when the photograph is taken.

Figure 2:
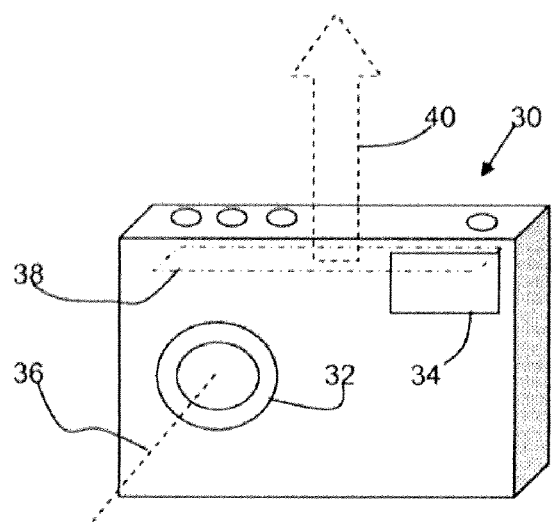
FIG. 2 shows a known camera with GPS system and shows the antenna mounting.

FIG. 2 shows a known camera with GPS system and shows the antenna mounting. The camera 30 has a lens 32 and a flash 34 on the front face. The lens has a focal axis 36 in the direction faced by the lens. The antenna 38 is typically a patch antenna formed on a PCB. The PCB forms has ground plane on side of the patch, and this gives the antenna an essentially hemispherical reception pattern, with the strongest reception perpendicular to the plane of the patch PCB (opposite to the ground plane). This strongest reception direction can be considered to be the direction faced by the antenna, and is the direction where the antenna has greatest gain and/or sensitivity.

Although most GPS antennae are designed to have a broadly hemispherical beam pattern (so you can mount them "pointing up" and see the whole sky), in practice they do not have a perfect hemispherical response and they do tend to have better response in the middle of the beam rather than at the edges. However, an antenna may have a broadly hemispherical beam pattern that does not have its peak response in the middle.

It is desirable for the patch antenna to be as large as possible. In the standard configuration shown in FIG. 2, the patch PCB is in the horizontal plane, so that the antenna is facing upwards as shown by arrow 40. This is of course the intuitive way to mount the antenna.

Figure 3:
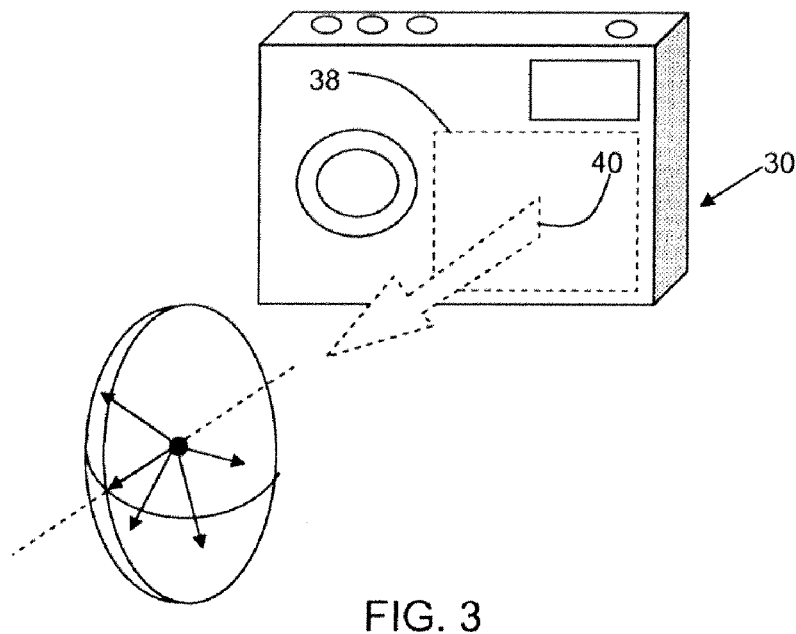
FIG. 3 shows a first example of system of the invention.

FIG. 3 shows the system of the invention, in which the antenna 38 is facing forwards. In this way, the strongest reception direction of the antenna axis is aligned with the camera lens focal axis 36.

One way to define the direction in which the antenna is "facing" is the direction which has a maximum integrated gain value, in which the "integrated gain value" is the gain integrated over all angles within a hemisphere centred on the given direction. This concept is shown schematically in FIG. 3, in which the gain values to be integrated to define the integrated gain value in the lens axis direction are the gain values in the directions from the centre of the hemisphere to every point on the surface of the hemisphere shown (some arrows show examples of the directions). Typically, the radiation pattern will give rise to the greatest sensitivity and/or maximum gain along this facing direction, but this is not necessarily the case.

Facing directly forwards is one example. More generally, the invention provides a gain (absolute gain or integrated gain value as explained above) in the direction of the lens axis which is greater than the gain in all directions perpendicular to the lens axis. For example, the integrated gain defined above can be greater in the lens axis direction than the integrated gain for all directions perpendicular to the lens axis (including the "up" direction).

A patch antenna can be mounted next to the camera CCD sensor, and can occupy a maximum available area. The patch antenna can be mounted on the outside of the camera casing or directly beneath the outer casing.

There are a number of advantages of this arrangement:

the front face (and back face) of the camera has the largest area, and thereby enables the largest antenna form factor. This large form factor also applies to the ground plane, which can be defined by the camera casing;

the front of the camera is generally not cluttered with user interface features and in use it is kept clear of obstruction, including the user's hands;

a forward facing antenna is more likely to give good GPS reception when taking a photograph out of a window. Indeed, in many photograph situations, the best view of the sky can be forwards rather than directly upwards;

the GPS reception is the same for portrait and landscape operation of the camera the antenna is screened from the user by the camera body.

The configuration of FIG. 3 is particularly attractive for a store and process later application, because the GPS function is only used when a photograph is being taken. This means the antenna will not generally be directed downwardly in use, so that GPS reception is reliable when required.

Figure 5:
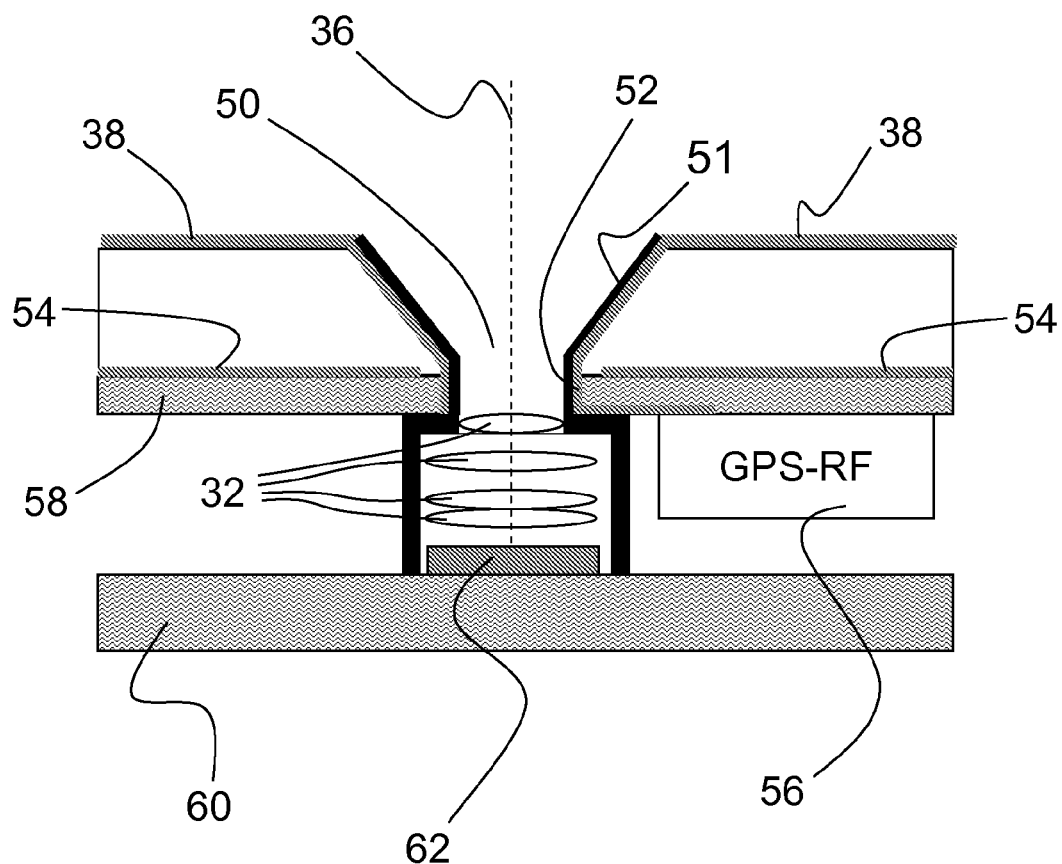
FIG. 5 shows a partial cross-sectional view of a camera according to an embodiment.

An example configuration which may particularly beneficial is shown in FIG. 5. In this example, the lens 32 of the camera (shown here as multiple lenses 32) looks through an opening 50 in the antenna 38. This allows the area on the front of the camera to be used more effectively to accommodate the substantially forward-facing antenna. Furthermore, the area immediately surrounding the lens axis 36 is one of the best locations for an antenna, because care will be taken by the photographer not to obscure the lens when taking a photograph. Therefore, if it is desired to synchronise image-capture with the capture of GPS signals, it may be advantageous to align the antenna 38 fully or partially with the lens axis 36. Note that the opening may be completely or partially enclosed by the patch antenna. For example, the opening may be a hole in the interior of the patch; alternatively the opening may be created by the peripheral contour of the patch—for example, as a slot or other recess or concavity in the boundary of the patch.

In the example shown in FIG. 5, the camera comprises a camera Printed Circuit Board (PCB) 60, on which is mounted a CMOS image sensor 62. An image is focused onto the sensor 62 by the lenses 32. As indicated by the optical axis 36, the light forming the image passes through an opening 50 in the antenna assembly. The antenna active part 38 is located above a ground plane 54, which is itself formed on RF PCB 58. Between the ground plane 54 and antenna part 38 is an air-gap or other dielectric. In this embodiment, the antenna RF feed passes through the opening. The RF feed connects the active part 38 with the GPS RF front-end 56. This front-end 56 typically comprises the amplification, filtering and down mixing in unit 12 driven by a reference oscillator 14, and N/D converter 16 discussed above. Preferably, a dark, matte plastic coating 51 on the sides of the opening 50 avoids unwanted reflections from the surface of the opening and thus ensures that the optical characteristics of the camera are preserved.

In the configuration shown in FIG. 5, for convenience and clarity of illustration, the lens elements 32 are shown lying behind the opening 50 in the antenna 38. However, the lens elements may also be positioned in the aperture of the opening 50 itself. This may facilitate further reduction in size of the camera along the dimension of the lens axis. This may be particularly advantageous in the example of a camera for a mobile phone, where it is desired to minimise the thickness of the overall device. In general, the arrangement of a lens in line with an opening in the antenna may work particularly well when the size of the hole is small. This benefit is also consistent with an implementation of a camera with a small lens aperture, such as typical camera units in mobile phones.

The GPS function can of course be used at times other than when taking photographs. A continuous GPS logger function can be used. To ensure good GPS signal strength, the camera can be laid on its back with the antenna facing up (for example in a car) or it can be positioned in a pocket/pouch of a user, again with the lens facing forwards/backwards (but facing away from the user to reduce obstruction) or upwards.

The invention can also be used in a conventional real time GPS application, and the invention is not limited to a store and process later system.

Figure 4:
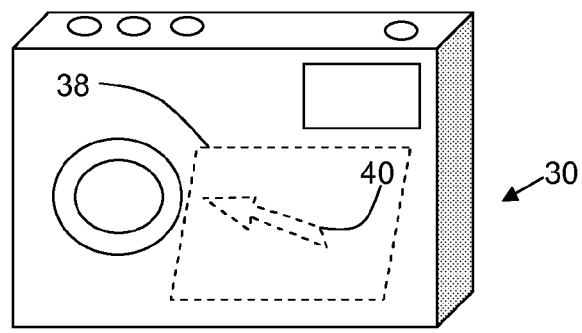
FIG. 4 shows a second example of system of the invention.

In the example above, the antenna faces the same way as the lens. However, the antenna may be offset from this angle so that there is still an upward facing component. This is schematically shown in FIG. 4. Of course, the narrow width of the camera will limit the amount of tilt that can be introduced, and the antenna will still generally face forwards, with the antenna axis is aligned to within 10 degrees of the camera lens focal axis. More preferably, the antenna axis is aligned within 8 degrees, more preferably within 5 degrees, and even more preferably within 3 degrees.

This tilt concept can be applied to both portrait and landscape modes, so that in both orientations of the camera, there is an upward component to the antenna direction.

The use of a patch antenna has been described, but the invention is not limited to this. An internal stub antenna or other antenna can also be used, and many of the advantages of the patch antenna example of the invention apply equally.

It has been recognised that an independent position estimate can be used to simplify the processing required to produce an accurate position fix. For example in an assisted GPS system ("AGPS"), an estimated location is provided to the GPS receiver, to assist in situations in which the GPS signals are weak, for example indoors. The estimated position is provided automatically, for example by a cellular base station serving the device, or as the previous position fix.

Improvements such as this to the satellite positioning systems reduce the need for strong satellite signals, and can be used in the camera of the invention to improve the reliability of the position fix.

Many variants are possible for the location of the processing in the case of a store and process later application. The processing can be done in the recording device at a later time (e.g. when external power is available and/or when connection to an ephemeris server is possible). The processing can for example be effected in a printer or print booth.

The processing may be carried out later, elsewhere, or on the camera itself, shortly afterwards. For example, this may be in order to carry out the processing task using computational capabilities of the platform which are naturally occupied during the time of the photograph itself, or to allow the processing to take place over a longer period—using a low performance platform and just letting it take longer. Alternatively, it may simply be desired to capture a sample of data and then process it at a different time—avoiding the electromagnetic interference that would be caused to the receiver by running the processor at the time of signal reception.

The invention has been described in connection with (single frequency) GPS, but other GNSS systems (GLONASS, Galileo etc) would be similar. Indeed the techniques could also be applied to multiple frequency systems.

Various other modifications will be apparent to those skilled in the art.

The invention claimed is:

1. A camera including a system for collecting data from a satellite positioning system, the camera comprising;
   a camera lens having a lens axis;
   a satellite receiver for receiving satellite broadcast data; and
   a satellite system antenna,
   wherein the satellite system antenna faces forwards and has a gain value in the direction of the lens axis which is greater than the gain value in all directions perpendicular to the lens axis,
   and the satellite receiver is adapted to collect the data when the camera takes a photograph, whereby the location at which the photograph was taken can be recorded.

2. A camera as claimed in claim 1, wherein the antenna comprises a substantially planar patch antenna.

3. A camera as claimed in claim 2, wherein the patch antenna is mounted with the plane perpendicular to the lens axis.

4. A camera as claimed in claim 2, wherein the patch antenna comprises an opening through which the lens axis passes.

5. A camera as claimed in claim 4, wherein the camera lens is arranged in the opening.

6. A camera as claimed in claim 4, wherein the antenna is electrically connected to the satellite receiver through the opening.

7. A camera as claimed in claim 2, wherein the patch antenna uses the camera casing as a ground plane.

8. A camera as claimed in claim 1, wherein the antenna is mounted on the front surface of the camera, which surface houses the lens.

9. A camera as claimed in claim 1, further comprising a memory, wherein the memory is adapted to store IF data samples.

10. A camera as claimed in claim 9, comprising means for providing IF data samples to an external device or service for deriving the position information.

11. A camera as claimed in claim 1, comprising processing means for deriving position information from the data samples.

12. A camera as claimed in claim 1, wherein the gain value comprises the integration of the gain in all directions from the antenna within a hemisphere centred on the given direction.

* * * * *